(12) United States Patent
Clark

(10) Patent No.: US 7,184,054 B2
(45) Date of Patent: Feb. 27, 2007

(54) CORRECTION OF A PROJECTED IMAGE BASED ON A REFLECTED IMAGE

(75) Inventor: James E. Clark, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 160 days.

(21) Appl. No.: 10/349,745

(22) Filed: Jan. 21, 2003

(65) Prior Publication Data

US 2004/0140981 A1    Jul. 22, 2004

(51) Int. Cl.
G09G 5/02 (2006.01)
G03B 21/00 (2006.01)

(52) U.S. Cl. .......................... 345/589; 353/70
(58) Field of Classification Search ................ 345/589, 345/600–605, 690; 382/167; 348/744, 790, 348/792
See application file for complete search history.

(56) References Cited

U.S. PATENT DOCUMENTS

| | | | |
|---|---|---|---|
| 5,781,252 A * | 7/1998 | Gale | 349/8 |
| 6,219,011 B1 * | 4/2001 | Aloni et al. | 345/1.3 |
| 6,259,430 B1 * | 7/2001 | Riddle et al. | 345/589 |
| 6,340,976 B1 | 1/2002 | Oguchi et al. | |
| 6,606,408 B1 * | 8/2003 | Kang et al. | 382/164 |
| 6,791,565 B2 * | 9/2004 | Kanai | 345/589 |
| 2002/0041708 A1 | 4/2002 | Pettitt | |
| 2002/0051001 A1 | 5/2002 | Kanai | |
| 2002/0051121 A1 | 5/2002 | Kanai | |
| 2002/0080289 A1 | 6/2002 | Koyama | |
| 2002/0159039 A1 * | 10/2002 | Yoneno | 353/85 |
| 2005/0057727 A1 * | 3/2005 | Troyer | 353/31 |

OTHER PUBLICATIONS

Majumder, Aditi, Zhu He, Herman Towles, and Greg Welch (2000). "Color Calibration of Projectors for Large Tiled Displays", Proceedings of IEEE Visualization 2000. Salt Lake City, UT, USA (Oct. 8-13), IEEE Computer Science Press. (PDF) (JPG Color Plate) (movie).

* cited by examiner

Primary Examiner—Matthew Luu

(57) ABSTRACT

A method of color-correcting a projected image is disclosed, including providing image data for a desired image, projecting the desired image onto a surface to produce a reflected image, comparing the reflected image to the image data to determine an observed difference, and modifying the projected image to reduce the observed difference.

12 Claims, 2 Drawing Sheets

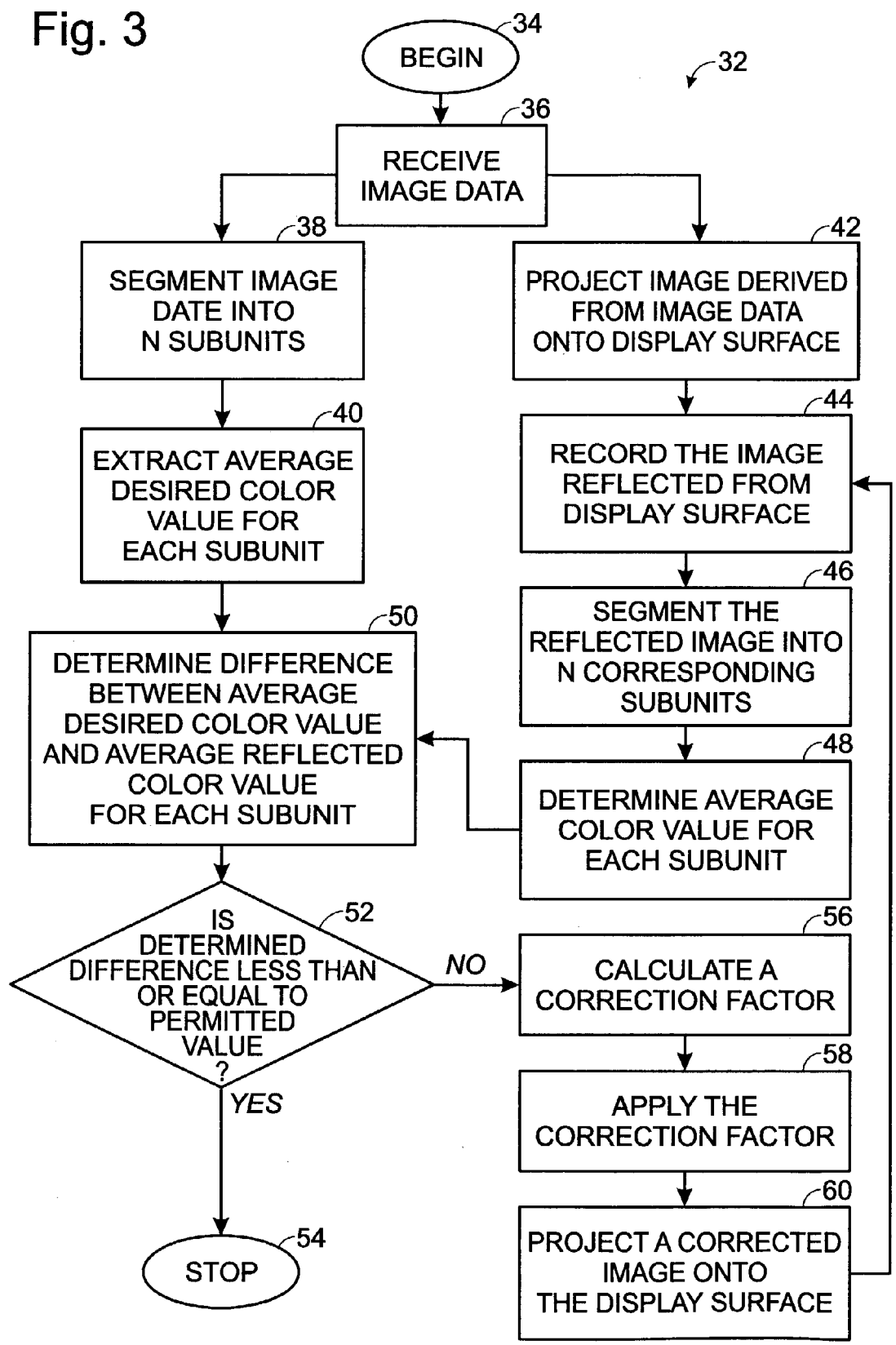

CORRECTION OF A PROJECTED IMAGE BASED ON A REFLECTED IMAGE

BACKGROUND

Image projection systems may be used to enlarge a still or video image, or to enable the image to be viewed simultaneously by a large or small audience. As both projection devices and the personal computers used to drive them have become increasingly smaller and more portable, it has become possible to give sophisticated visual presentations in venues that were previously inaccessible.

Unfortunately, although modern projection equipment may now require only a power socket, many rooms may lack a suitable projection surface. Bringing along a projection screen, however, may compromise the portability of modern projection apparatus. The alternative, projection of an image onto even a lightly colored wall, may detract from the content of the presentation. A projection system that actively compensates for the color characteristics of a projection surface thus would be desirable.

SUMMARY

A method is provided, including providing image data for a desired image, projecting the desired image onto a surface to produce a reflected image, comparing the reflected image to the image data to determine an observed difference, and modifying the projected image to reduce the observed difference.

BRIEF DESCRIPTION OF THE DRAWINGS

FIG. 3 is a flowchart depicting a method of color-correcting a projected image, according to an embodiment of the invention.

DETAILED DESCRIPTION

Figure 1:
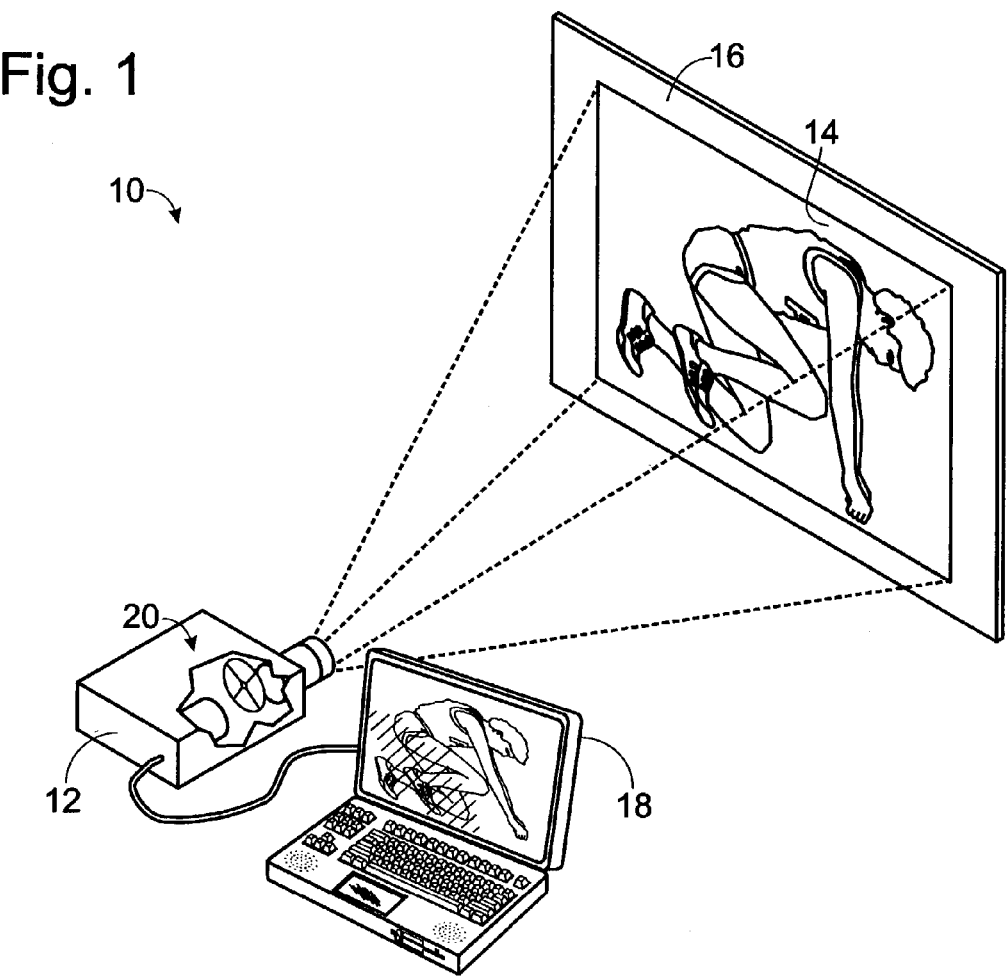
FIG. 1 is an isometric view of a display system according to an embodiment of the invention.

Referring initially to FIG. 1, a display system according to an embodiment of the present invention is shown generally at 10. Specifically, FIG. 1 illustrates a display system including a projector 12 adapted to produce an image 14 on a display surface 16. Projector 12 typically is associated with a source of image data, depicted in FIG. 1 as a laptop computer 18. Projector 12 thus may be configured to project an image 14 derived from the image data received from computer 18 onto display surface 16.

The projector may take the form of a digital projector, or any other suitable projection device. It should be appreciated that many types of projection systems may be suitable for the purposes of this disclosure. The projector itself may include, but is not limited to, digital overhead projectors, active liquid crystal display (LCD) projection devices, and micromirror-based projection devices. The images projected by the image projector may include still images or video images. Both still and video images will be referred to herein simply as projected images.

Projector 12 typically includes a light engine 20. Light engine 20 is typically configured to direct and transmit light to display surface 16 so as to generate a projected image that is derived from, and therefore generally corresponds to, the image data received from computer 18. Light engine 20 may include any suitable illumination source adapted to optically address display surface 16, including single white light sources (such as a mercury lamp, plasma lamp, incandescent lamp, etc.) and/or multiple white or single color light sources (such as light emitting diodes (LEDs), laser diodes, etc.). Additionally, projector 12 may include optics, spatial light modulators, scanning mirrors, focusing devices, color-generation devices, controllers, etc. which may accommodate production of a multi-color image on the display surface.

Figure 2:
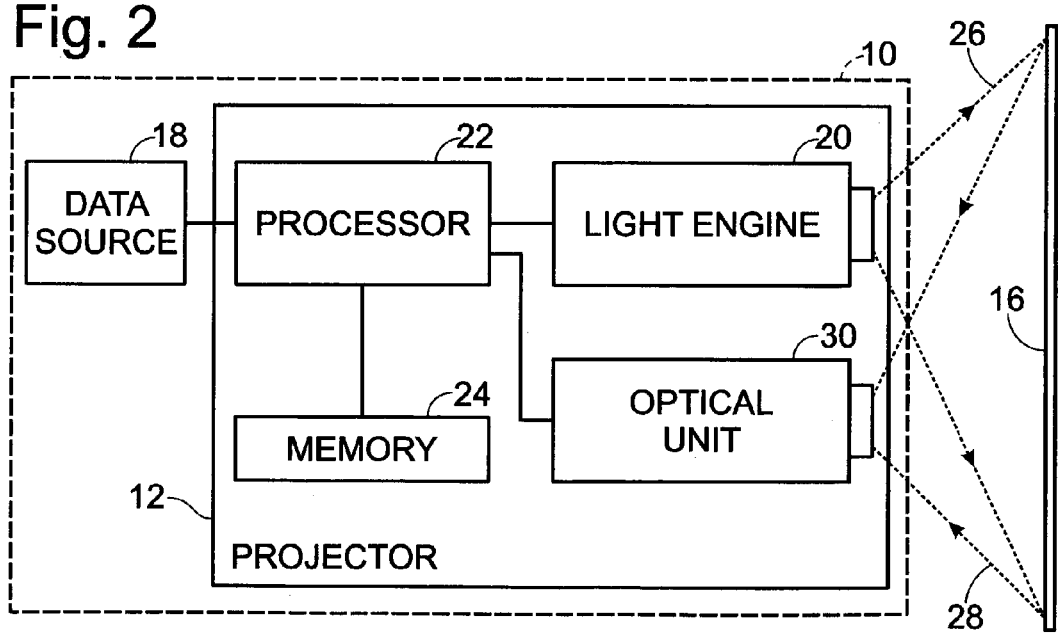
FIG. 2 is a schematic representation of the display system of FIG. 1.

As depicted schematically in FIG. 2, display system 10 may also include a processor 22 that is configured to receive the image data from image data source and to convert the image data into commands appropriate for driving light engine 20. Processor 22 may be included with projector 12, as shown, or may be an independent processor that is associated with the projector. Processor 22 may be in communication with a memory 24 that serves as temporary (or long term) storage of data such as calibration information, color information, and other data needed by processor 22 to operate projector 12.

The image data source 18 may be, without limitation, a personal computer, such as a notebook computer, a personal digital assistant, or a mainframe computer such as a file server. The data connection between the image data source and the projector processor may include a hardwire connection, or may be a wireless data connection. Where the data connection is a hardwire connection, the hardwire connection may be a cable, in a local area network or a large area network. Alternatively, the data connection may include a wireless connection that utilizes modulated radiation, typically an infrared or rf (radio frequency) signal. Alternatively, projector 12 may create the projected image from image data stored internally by the projector, for example, using memory 24, so that connection to an external data source is unnecessary. Similarly, projector 12 may include a disk drive or other auxiliary memory device, enabling image data to be received by processor 22 directly.

In response to commands from the processor, light engine 20 typically directs and transmits visible light in the form of a projected image 26 to display surface 16 to produce reflected image 28, where reflected image 28 nominally is related to the projected image as a mirror image. Such relationship assumes, however, that light engine 20 perfectly produces the color characteristics defined by the image data received by the projector, and that display surface 16 provides a perfectly neutral and reflective display surface. This may not necessarily be the case in every instance.

Color characteristics, as used herein, may include the hue, intensity, and brightness of all or a portion of an image. Such color characteristics may be represented and accurately defined with reference to the coordinates of a particular color space. A color space is typically a mathematical construction that permits color information to be described numerically and/or plotted graphically. Various color spaces may reference color values such as hue, lightness, brightness, value, reflectance, vividness, saturation, or chroma, among others.

Such selected color spaces may include HVC (Munsell) color space, RGB color space, HSV color space, HSL color space, YCC color space, XYZ color space, L*a*b* color space, L*u*v* color space, Lhs color space, Lhc color space, YXY color space, CMY color space, or CMYK color space, among others. These color spaces are typically characterized by the use of independent axes that define selected color values, as set out in Table 1 below for selected color spaces:

TABLE 1

Commonly used color models

| Color Model | Axis 1 | Axis 2 | Axis 3 |
|---|---|---|---|
| RGB | red intensity | green intensity | blue intensity |
| HVC | hue | value | chroma |
| HSV | hue | saturation | value |
| HSL | hue | saturation | lightness |
| L*a*b* | lightness | red/green balance | yellow/blue balance |
| Lhs | lightness | hue | saturation |
| Lhc | lightness | hue | chroma |
| CMY | cyan | magenta | yellow |

Color data incorporated in an image file may be defined with reference to coordinates in a selected color space. Coordinates in a particular color space may generally be converted to coordinates in an alternative color space by using an appropriate mathematical transform. The image data sent to the projector may include color information in RGB color space, or the image data may be converted to RGB color space before generation of the projected image by the light engine, as projection devices typically create a desired color by projecting an appropriate combination of red, blue, and green light (additive color synthesis).

As described above, an ideal light engine should be capable of generating a projected image having color characteristics that precisely match the color characteristics defined by the image data. Similarly, an ideal display surface should produce a reflected image having the color characteristics specified by the image data. However, in actual practice, the color characteristics of reflected image 28 may be detectably different from the color characteristics defined by the image data which the projector receives. Potential sources for these differences, for example, may include errors in the transformation of the image data into commands for the light engine 20, malfunctions or deficiencies in the operation of the light engine, deficiencies in the optical pathway of the projector, and/or the contributions to the reflected image of a display surface that is not chromatically neutral. A possible result of one or more of these factors is that the color characteristics of reflected image 28 may be detectably different from those specified by the image data.

For example, the display surface may include a non-neutral surface color, such as a yellow tint. The projection of white light onto such a display surface will yield a yellow tinted reflected image, as the pigments in the wall absorb a portion of the non-yellow wavelength of the incident white light, and disproportionately reflect the yellow wavelengths. The net result in this case may be a reflected image that includes a greater yellow component than was specified by the original image data.

In a far more complicated example, the display surface may include one or more markings, for example such as may be present in a wallpaper pattern. The projection of an image on such a non-homogeneous display surface may result in an unsatisfactory reflected image, where the presence of such visible markings may distract the viewer from the content of the projected image.

In order to compensate for the color characteristics of the display surface, display system 10 may include a feedback system that permits the output of light engine 20 to be modified in order to at least partially compensate for the color characteristics of the display surface. The feedback system may be generally configured to compare the reflected image to the desired image as defined by the image data in order to identify detectable differences between the reflected image and the desired image. Once the detectable differences have been identified, the projected image may be modified in order to at least partially compensate for the identified detectable differences.

The feedback system may be incorporated in projector 12, or may be incorporated in a separate device that is associated with projector 12. As shown in FIG. 2, the projector may include an optical unit 30 that is configured to detect the optical characteristics of the reflected image. Optical unit 30 may include a sensor, where the sensor may be configured to detect the color characteristics of the reflected image. Typically, the optical unit includes a camera, however any sensor capable of detecting the desired color characteristics is a suitable sensor for the purposes of this disclosure. The light sensor may include a charge-coupled device (CCD), a photodiode, or other light-sensitive element.

The optical unit may be associated with the projector, either incorporated within the projector itself, or distinct from the projector. Where the optical unit is distinct from the projector, the optical unit may be a camera located in substantially close proximity to the projector, minimizing the possible distortion in the image caused by viewing the reflected image at an angle.

Even if located within the projector, the optical unit is located so as to minimize differences in the field of view of the optical unit and the reflected image. In fact, the digital image projector and the optical unit may utilize the same optics for both projection and image sensing. This may be accomplished, for example, by placing a beamsplitter in the optical pathway of the digital projector, so that the projected image generated by the light engine of the projector passes through the beamsplitter, while a portion of the light reflected from the display surface is reflected by the beamsplitter and directed to the optical unit. The use of a single set of optics for both projection and image sensing simplifies the setup of the display system, and may also facilitate calibration of the optical unit.

Once the optical unit has detected and/or recorded the color characteristics of the reflected image, the display system may compare the reflected image to the image data. Although many methods and strategies may be employed for performing a meaningful comparison between the reflected image and the received image data, in one embodiment, the analysis may be facilitated by segmenting the image data into a plurality of image subunits in order to compare the color characteristics of a particular subunit (or subunits). The actual number of subunits is not necessarily critical, but may be chosen for either speed of calculation or the quality of the resulting color correction. For example, while dividing the image data into small subunits may improve the fidelity of the color correction and resolution of the corrected image, doing so may result in slower data processing, and therefore compromise refresh speed, a feature particularly noteworthy for moving images. In contrast, segmenting the image data into larger subunits (and thus a relatively small number of subunits) may enhance processing time, but may also result in poor color correction, as the resolution of the correction factors applied may be low. Satisfactory color correction and adequate processing time may be achieved through the use of multiple high speed parallel processors dedicated to performing the requisite color comparison and color correction operations. The use of such processing systems may result in the ability to perform real-time color correction.

The image data may be segmented into an array of, for example 100 subunits by 100 subunits, resulting in 10,000 individual image segments. The number of subunits chosen for implementing the disclosed color correction process may be limited by the speed and processing ability available for a given projector, It should be appreciated that with appropriate computational resources, the image data may be segmented into larger arrays, such as an array of 640 by 480 subunits (307,200 segments), or as many as 1,600 by 1,200 subunits (1,920,000 segments).

Once the image data has been segmented, the processor may extract the value of the average color for each subunit. Typically, the extracted color correspond to a numerical value in a selected color space representing the average color intensity for that subunit. For example utilizing RGB color space, a selected subunit may be found to have an average red value, an average green value, and an average blue value over the entire subunit. The average color intensity may be determined by taking an arithmetic average of the calculated color intensity over the area of the subunit. For example, Take a selected subunit of image data that includes 10 pixels. If half the subunit pixels have a color value in RGB color space of (R, G, B)=(100, 100, 200) and half the subunit pixels have a color value of (R, G, B)=(200, 100, 150), the average red intensity for the subunit may be obtained by averaging across the subunit:

$$R_{ave} = \frac{(5 \times 100) + (5 \times 200)}{10} = 150$$

$$G_{ave} = \frac{(10 \times 100)}{10} = 100$$

$$B_{ave} = \frac{(5 \times 200) + (5 \times 150)}{10} = 175$$

resulting in an average calculated color value for the selected subunit of (R, G, B)=(150, 100, 175). It should be appreciated that the average color value is not dependent upon a particular color space, and that a similar calculation may be performed in other coordinate systems.

Average color values may be similarly extracted for each of the subunits of the image data, and these average values may be stored in memory 24. The original image data may be used to generate the projected image with the light engine. Optical unit 30 may then detect the resulting reflected image. The color characteristics for the reflected image may be stored in memory 24 as well. In order for processor 22 to meaningfully compare the color characteristics of the reflected image with the calculated average color values, the detected reflected color characteristics may be segmented into subunits corresponding generally to the subunits of the original image data. That is, the color data detected for the reflected image may be segmented into the same number, relative size, and relative placement within the image. The average color intensity across each reflected subunit may then be calculated, similarly to the calculation of the average image data color intensity above.

Processor 22 may compare the average color intensity for each reflected subunit with the calculated average color intensity for the corresponding image data subunit. Where the reflected subunit exhibits an average color value that differs from the calculated average color intensity, the processor may apply a correction factor to the image data for each subunit that exhibits such a detectable difference.

It should be appreciated that there may be a predetermined threshold difference value below which no correction is applied. Where the reflected image color and the calculated image color differ only slightly, for example by an amount below the detection threshold of an average viewer, a correction of the projected image may be unnecessary and therefore not applied.

Where a correction may be necessary, the correction factor may be applied to a projection value, that is, to one or more parameters used to generate the projected image. For example, the correction factor may be applied to the image data received from data source 18, such that the color values defined in the image data are modified so as to reduce the difference between the desired image and the reflected image. Alternatively, the correction factor may be applied to the particular light engine commands derived from the image data that correspond to the instructions to the light engine to project a particular image. In yet another alternative, the correction factor may be applied directly to the operating parameters of the light engine independent of the particular commands received by the light engine, for example scaling the output intensity of the light engine up or down, or increasing the contrast of the light output. In any case, the correction factor may be selected so as to compensate for the characteristics of the light engine or display surface that produce the observed differences. Accordingly, application of the correction factor may serve to reduce the observed differences in the reflected image color value relative to the desired or expected color characteristics represented by the image data.

Typically, the applied correction factor corresponds to an alteration of the projected light intensity in one or more of the red, green, or blue channels. Where the determined difference in color characteristics is due to a deficiency or malfunction in the light engine itself, the application of a correction factor may substantially correct the determined difference. For example, where the light engine projects red light at a reduced intensity relative to the projected green and blue intensity levels, a correction factor may be applied to the color data for the entire projected image to overcome the deficiency. For example where the calculated average color intensity (R, G, B) is (120, 210, 195), but the determined average reflected color intensity is (108, 211, 196), the correction factor may correspond to multiplying the red value of the image data by a factor of 1.1. Similar scaling operations may be used in order to apply a correction factor to the entire projected image.

Where the detectable difference in color characteristics may be due to the display surface having a nonhomogeneous appearance, for example due to the presence of surface markings, an applied correction factor may be used to at least partially compensate for the chromatic content of the surface markings. Where the surface marking have approximately the same size as, or are larger than the size of the subunits, application of the correction factor is more likely to minimize the effect of the surface markings. Where the surface markings are smaller than the size of the subunits, the color correction will be based upon the average color value for the subunit, and the markings may therefore remain substantially visible after correction.

In a simplified view we may consider the case where the display surface includes red markings. The surface markings are perceived as 'red' because the markings themselves absorb wavelengths of light other than light having a wavelength in the red region, which is reflected. Where the projector attempts to project a white light onto such red markings, (where white light is defined as (R, G, B)=(255, 255, 255) for example) reflected light from the surface markings may exhibit a pink color, for example corresponding to a reflected average color of (R, G, B)=(255, 200, 200). The application of a correction factor to a subunit falling within such a marking may include implementing a corresponding decrease in the intensity of red light for that subunit of the projected image, so that rather than projecting white light, light having a color quality of, for example, (R, G, B)=(200, 255, 255) may be projected onto the surface marking. As the surface marking differentially absorbs green and blue wavelengths, but substantially reflects red, the resulting reflected light may have a color intensity of, for example, (R, G, B)=(200, 200, 200). Although the corrected subunit may not appear white as specified by the image data, the subunit may exhibit a corrected appearance that includes a chromatically neutral gray rather than pink, and the visual impact of the surface marking on the overall projected image may be thereby decreased.

It should be apparent that rather than decreasing the intensity of the light reflected by the surface marking, a similar correction may be effected by increasing the intensity of the wavelengths absorbed by the surface marking. In the above example, rather than decreasing the output in the red wavelengths, the blue and green wavelengths could be correspondingly increased. This correction mode may be available where additional light intensity is available to the projector used at the particular subunit under evaluation.

The correction factor may be determined for a given projected image only once. For example, as part of an initial power up of the projector, the light engine may project one or more color calibration screens. A correction factor may be determined based upon an initial comparison of the expected color of the calibration screen and the detected color of the calibration screen. The correction factor could then be applied to a projection value for subsequent projected images, until the projector is recalibrated or shut down. This mode of operation may be particularly desirable where the projector is fixed and the display surface does not vary during a given presentation.

Alternatively, the correction factor may be determined using an ongoing process, where color analyses may be performed periodically, with the determination of new correction factors. The correction factor may also be determined using an iterative process, where a first correction factor is applied, generating a corrected projected image, and the corrected reflected image is then compared to the image data. Differences between the corrected reflected image and the image data may then result in the application of one or more additional correction factors, with additional correction of the projected image occurring iteratively until either the color characteristics of the reflected image match the desired color characteristics, for example to within an predetermined and acceptable error value, or until the processor recognizes that no further correction is possible.

The color correction process described herein may occur in real-time. That is, the projector may be actively correcting the color output of the light engine on an ongoing basis as a presentation is projected. The ability of the projector to accomplish real-time color correction may be limited by the capabilities of the processor used to analyze the image data and the reflected image color characteristics. As discussed above, the demand on the processor may be related to the number of subunits the outgoing and incoming image is subdivided into. The possibility of real-time color correction, with an ability to rapidly compensate for variations in the appearance of the display surface may permit a projected presentation to be displayed on a constantly or intermittently variable display surface (for example, where the presentation is projected from a moving platform such as a rotating stage or moving vehicle).

A method of color-correcting a projected image using the feedback system of display system 10 is depicted generally in flowchart 32 of FIG. 3. Upon initiation of the method at 34, the projector typically receives image data from the data source at 36. The image data may then be segmented into N subunits at 38 and an average color value may be extracted from each subunit at 40. Simultaneously or sequentially, the projector may project an image derived from the image data onto the display surface at 42. The resulting reflected image may then be recorded at 44 and segmented into N subunits selected to correspond to the segmented subunits of the image data at 46. An average color value may then be determined for each of the reflected image subunits at 48. The processor may then determine the difference between the average desired color value and the average reflected color value for each subunit at 50.

If a detectable difference exists, the processor may determine whether the detectable difference is less than or equal to a predefined permitted difference value at 52. Where the detectable difference is less than the predefined permitted difference value, the color quality of the reflected image is considered satisfactory and the feedback system stops at 54. Where the detectable difference is greater than the permitted difference value, the processor may calculate a correction factor at 56, and apply the correction factor to the image data, the light engine, and/or some other aspect of the display system at 58. A corrected image may then be projected onto the display surface at 60, and the resulting reflected image recorded at 44, initiating an additional feedback cycle.

The color correction method depicted in flowchart 32 may be used upon initiating a presentation, as part of the display system calibration. The correction factor determined thereby may be applied throughout the following presentation.

Alternatively, the display system may be configured to perform a single feedback cycle upon receipt of new image data, that is, to calculate and apply a single correction factor for a particular set of image data. In another alternative, the display system may perform multiple feedback iterations, refining the correction factor that is applied during each cycle. It is possible that due to the nature of the display surface, or limitations of the projector, no correction factor may completely correct the reflected image. In this case, the display system may be configured to abandon the feedback loop after a predetermined number of iterations, in order to avoid interfering with the projected presentation.

Alternatively, or in addition, the display system may apply a color correction method similar to that depicted in flowchart 32 wherein new image data is periodically received. For example, where the presentation includes one or more static images, or slides, color correction may be performed whenever the image data changes. Where the presentation includes moving images, or video images, the image data may be updating substantially constantly. In this case, the display system may be configured such that color correction occurs at a predetermined periodic rate, or that only a single iteration of the color correction process is performed before new image data is received. It should be appreciated that a variety of methods may exist for performing the color correction method disclosed herein as new image data is received by the projector.

In order for display system 10 to properly achieve the color correction described herein, it may correlate the projected image with the image data saved in memory. In order to perform such correlation, the display system may be calibrated in order to establish a relationship between the captured reflected image and the projected image. Such calibration processes may be simplified where the image sensor and the digital image projector utilize the same optical pathway, as discussed above. However, where the image sensor and the digital projector do not share an optical pathway, calibration of the image sensor may be useful in accurately mapping the subunits of the color data captured by the optical unit onto the subunits of the image data formulated by the processor.

A variety of calibration methods and timing may be utilized. Calibration may be automatic upon startup of the projector, or upon manual activation of a calibration routine, for example using an operator interface such as a touchpad on the projector, or by executing a command at an associated computer. The calibration procedure itself may be automatic, or may require operator input. For example, upon execution of a calibration command, the projector may project a full screen of a selected color, whereupon the optical unit in combination with the processor interprets a captured image of the projected image to identify the four corners of the projected image and associate them with corresponding "corners" of the image data.

Alternatively, upon activation of a calibration feature, an operator may sequentially 'paint', or project a point light source onto, each corner of the projected image for the optical unit to capture, thereby permitting the processor to map the projected image to the corresponding image data. Although the calibration methods described herein are intended to generate correspondence between the image data and the captured color characteristics in order to facilitate the color correction processes described herein, such calibration techniques may also be utilized to identify and digitally compensate for keystoning and other errors in projection that may affect the projected image.

Appropriate software instructions to effect the methodology of an embodiment of the invention may be employed via a computer-readable medium. A "computer-readable medium," as used herein, can be any means that can contain, store, communicate, propagate, or transport such instructions for use by or in connection with an imaging system or imaging apparatus. The computer-readable medium can be, without limitation, an electronic, magnetic, optical, electromagnetic, infrared, or semiconductor system, apparatus, device, or propagation medium. More specific examples of a computer-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), and a portable compact disc read-only memory (CDROM) (optical). Note that the computer-readable medium could even be paper or another suitable medium upon which the program may be printed, as the program can be electronically captured, via for instance optical scanning of the paper or other medium, then compiled, interpreted or otherwise processed in a suitable manner if necessary, and then stored in a computer memory.

The instruction on the computer-readable media may represent an upgrade to projector software previously available, in order to permit the execution of the above-described method, or to execute an upgraded version of such software.

The display system described herein permit a display system operator to compensate for nonideal display surfaces by performing real time color correction of a projected image. The display system facilitates impromptu presentations on nonstandard display surfaces without the typically concomitant loss of image fidelity, or even projection of presentations upon moving surfaces, or from moving projection platforms. The resulting presentation may offer improved fidelity in color reproduction in a variety of projection venues.

Although the present disclosure has been provided with reference to the foregoing operational principles and embodiments, it will be apparent to those skilled in the art that various changes in form and detail may be made without departing from the spirit and scope defined in the appended claims. The present disclosure is intended to embrace all such alternatives, modifications and variances that fall within the scope of the appended claims.

What is claimed is:

1. A method of presenting a projected image, comprising:
 a) providing image data for a desired multi-color image;
 b) projecting the desired multi-color image onto a surface to produce a reflected image;
 c) comparing the reflected image to the image data to determine an observe difference;
 d) modifying the projected desired multi-color image to reduce the observed difference;
 e) repeating a)–d) on an ongoing real-time basis;
 recording color data from the reflected image:
 segmenting the image data spatially into a plurality of subunits; and
 segmenting the recorded color data spatially into a corresponding plurality of subunits.

2. The method of claim 1 where comparing the reflected image to the image data includes determining an average color for each image data subunit, and determining an average color for each reflected image subunit.

3. The method of claim 2 where comparing the reflected image to the image data includes comparing image data average color to reflected image average color for at least one subunit to determine the observed difference.

4. The method of claim 1 where modifying the projected desired multi-color image includes determining a correction factor to reduce the observed difference.

5. The method of claim 4 where modifying the projected desired multi-color image includes applying the correction factor to the image data.

6. The method of claim 4 where modifying the projected image includes applying the correction factor to commands received by a light engine to create the projected image.

7. The method of claim 4 where modifying the projected image includes applying the correction factor to one or more operating parameters of a light engine used to create the projected image.

8. The method of claim 1 where modifying the projected image includes determining a correction factor for each spatial subunit to reduce the observed difference.

9. The method of claim 1 where segmenting the image data includes segmenting the image data into an array of subunits independent of the image data content.

10. A method of presenting a projected image, comprising:
 providing image data for a desired image;
 projecting the desired image onto a surface to produce a reflected image;

recording color data from the reflected image;
segmenting the image data spatially into a plurality of subunits;
segmenting the recorded color data spatially into a corresponding plurality of subunits;
comparing the spatial subunits of the reflected image to the corresponding spatial subunits of the image data to determine an observed difference; and
modifying the projected desired image to reduce the observed difference.

11. The method of claim 10 where segmenting the image data includes segmenting the image data into an array of subunits having a predetermined number of rows and columns.

12. The method of claim 10 where modifying the projected desired image includes determining a correction factor for each subunit to reduce the observed difference.

* * * * *